United States Patent [19]
Horner

[11] 3,789,738
[45] Feb. 5, 1974

[54] EXTENSIBLE PISTON
[75] Inventor: Richard F. Horner, South Bend, Ind.
[73] Assignee: The Bendix Corporation, South Bend, Ind.
[22] Filed: Mar. 24, 1972
[21] Appl. No.: 237,777

[52] U.S. Cl............... 91/168, 92/52, 188/370
[51] Int. Cl.................. F15b 11/18, B60t 11/00
[58] Field of Search.......... 91/152, 153, 168; 92/52; 60/54.5 M, 54.6 M, 54.5 S, 54.6 S; 188/196 A, 351, 370

[56] References Cited
UNITED STATES PATENTS
| | | | |
|---|---|---|---|
| 2,804,848 | 9/1957 | O'Farrell et al. | 91/168 |
| 3,581,849 | 6/1969 | Landgraf | 188/196 A |
| 3,150,563 | 9/1964 | Carrigan et al. | 92/52 |
| 3,431,730 | 3/1969 | Bueler | 188/196 A |

Primary Examiner—Martin P. Schwadron
Attorney, Agent, or Firm—Gordon H. Chenez; William N. Antonis

[57] ABSTRACT

A fluid pressure actuated piston having an outer piston member and an inner piston member slidable therein which pistons have equivalent areas exposed to said fluid pressure and are sequentially pressurized thereby providing extended piston travel. The outer piston is operatively connected to a normally closed fluid vent which is opened to vent the pressurized fluid to the inner piston substantially simultaneously with engagement of the outer piston with a fixed stop whereupon the inner piston continues to move.

5 Claims, 1 Drawing Figure

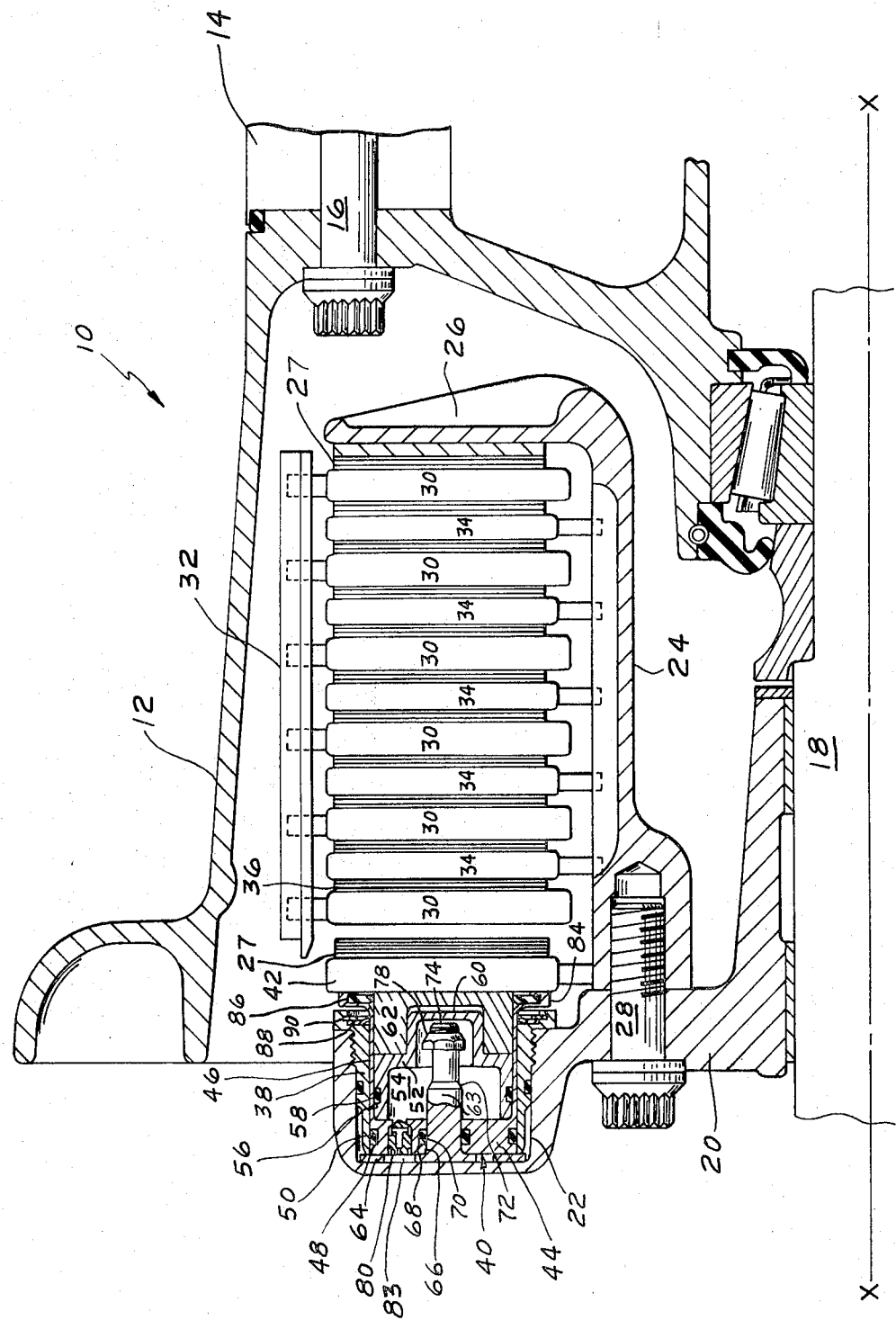

EXTENSIBLE PISTON

BACKGROUND OF THE INVENTION

The present invention relates to fluid pressure actuated force generating collapsible pistons.

Fluid pressure actuated pistons of the extensible type of which I am aware are not entirely satisfactory for operation in certain environments such as, for example, fluid pressure actuated aircraft disc brakes by virtue of complexity, weight, volume and/or inequality of effective fluid pressure responsive areas of multiple piston arrangements.

SUMMARY OF THE INVENTION

The present invention provides a fluid pressure actuated extensible piston characterized by structural simplicity, small volume and light weight.

The present invention provides a fluid pressure actuated piston having concentric inner and outer piston portions and control means connected thereto for sequentially pressurizing the same to provide a range of piston movement in excess of that of the outer piston alone.

The present invention provides a fluid pressure actuated force generating piston having concentric inner and outer piston portions provided with means for equalizing the effective fluid pressure responsive areas thereof and controlling the pressurization thereof in sequence.

BRIEF DESCRIPTION OF THE DRAWING

The drawing represents a sectional schematic illustration of a conventional fluid pressure actuated multiple disc aircraft brake embodying the present invention.

DESCRIPTION OF THE PREFERRED EMBODIMENT

Referring to the drawing, numeral 10 designates an aircraft wheel and multiple disc brake therefor. The wheel is defined by two annular sections 12 and 14, only one which is fully shown, fastened together by circumferentially spaced bolts and nuts generally indicated by 16. The wheel is suitably journaled on a rotatably fixed axle 18 carried by conventional aircraft landing gear strut structure, not shown. An annular brake carrier 20 suitably keyed to axle 18 is provided with a plurality of circumferentially spaced-apart cavities 22, only one of which is shown, vented to a source of pressurized fluid controlled by the aircraft pilot. A torque tube 24 having an integral backing plate 26 suitably lined with friction material 27 is fixedly secured to brake carrier 20 by a plurality of circumferentially spaced-apart bolts 28. A plurality of spaced-apart annular brake rotor members 30 are suitably keyed to a retaining member 32 fixedly secured to wheel section 12 and adapted to permit axial movement of the rotor members 30 relative to wheel section 12. A plurality of annular brake stator members 34 having friction lining 36 secured to opposite faces thereof are suitably keyed for axial movement to torque tube 24.

The cavities 22 are each provided with a sleeve 38 threadedly secured to carrier and adapted to slidably contain fluid pressure actuated piston means generally indicated by 40. The piston means 40 when pressurized is urged axially into engagement with an annular pressure plate 42 suitably keyed for axial movement to torque tube 24 which pressure plate, in turn, compresses the rotor and stator members, 30 and 34, together against the resistance of backing plate 26 to retard rotation of rotor members 30 and thus the wheel attached thereto. The pressure plate 42, like backing plate 26, is lined with friction material 27.

It will be recognized that the piston means 40 is necessarily confined in a limited space and must have an axial travel range sufficient to compensate for the accumulative axial wear of the friction lining 27 and 26 over a period of brake use. Also, the effective area of the piston means 40 and thus the braking force imposed on pressure plate 42 for a given brake application by the pilot must remain stable for obvious reasons. To that end, the present invention provides a large or outer piston 44 having an integral skirt 46 slidably contained by sleeve 38. An annular recess 48 in the outermost wall of piston 44 is adapted to receive a suitable fluid seal such as O-ring 50 to provide a slidable fluid seal between piston 44 and sleeve 38. A small or inner cup-shaped piston 52 is slidably carried in inverted position in skirt 46 and together with piston 44 defines an expansible chamber 54. An annular recess 56 in the outermost wall of piston 52 is adapted to receive a suitable fluid seal such as O-ring 58 to provide a slidable fluid seal between adjacent surfaces of skirt 46 and piston 52. The closed end of piston 52 is reduced in diameter as at 60 and extends into a cup-shaped member 62 suitably secured thereto and formed of conventional heat insulating material to minimize heat transfer from the pressure plate 42 to piston 52.

A stud or post member 63 is provided with an integral plate 64 at one end thereof which plate is trapped at its outermost portion between sleeve 38 and end wall of cavity 22 thereby fixedly securing post 63 in position. The post member 63 is concentric with sleeve 38 and extends through a central opening 66 in piston 44 into chamber 54. An annular recess 68 in the wall of opening 66 is adapted to receive a suitable fluid seal such as O-ring 70 thereby providing a slidable fluid seal between adjacent surfaces of post member 64 and piston 44. The free end of post member 63 is tapered or beveled as at 72 and terminates in a reduced diameter end portion 74 threaded to receive a nut 78 which acts as a stop for piston 44 as will be described.

A bleed valve 80 adjustably secured in a threaded opening 82 in piston 44 may be rotated to an open position with a suitable tool such as an allen or hex wrench to vent fluid pressure from chamber 54 thereby permitting piston 52 to retract into engagement with piston 44 as shown in the drawing. One or more openings 83 in plate 64 provide fluid access to piston 44 as well as access to bleed valve 80.

The skirt 46 may be provided with a radially outwardly extending annular flange 84 suitably recessed to receive a flexible dust or wiper seal 86 adapted to slidably engage the surface of cup-shaped member 62 and piston 52.

The sleeve 38 may be suitably recessed to receive an annular dust or wiper seal 88 which is held in position by a C-clip 90 engageable with sleeve 38.

The piston means 40 including sleeve 38 and post 63 is adapted to be inserted as an assembled unit in cavity 22. To that end, the piston 44 is inserted into sleeve 38 and post 63 inserted through opening 66 permitting plate 64 to bear against sleeve 38. The nut 78 is threaded on end portion 74 and adjusted in spaced relationship to beveled portion 72 as shown. The piston 44 may be positioned upright and partially filled with fluid to an extent sufficient to fill chamber 54 with piston 52 inserted in skirt 42. The bleed valve 80 is opened thereby bleeding fluid from chamber 54 to ambient pressure as piston 52 is compressed into engagement with piston 44. The chamber 54 is sealed by closing bleed valve 80 whereupon ambient pressure is sufficient to hold the piston 52 in assembled position. The sleeve 38 with piston means 40 therein may then be threadedly secured in position in cavity 22.

Assuming the wheel and brake 10 to be assembled for normal operation as shown in the drawing, application of pressurized fluid to cavities 22 results in equal pressurization of pistons 44 which through pistons 52 solidly bearing thereagainst urge pressure plate 42 against the interleaved rotor and stator members 30 and 34 compressing the same against backing plate 26 to produce the desired braking action retarding wheel rotation. It will be recognized that repeated brake applications will result in corresponding increased axial displacement of piston 44 as subsequent braking application occur. Since the range of axial travel of piston 44 is normally limited by virtue of the axial depth of cavities 22 and thus sleeve 38 in which pistons 44 slide, full advantage of the wear capability of the friction material may not be attained. However, assuming brake wear has progressed to a degree requiring movement of piston 44 as well as piston 52 bearing thereagainst to a position along post 63 where piston 44 engages nut 78, the "O" ring 78 will have slipped over beveled portion 72 and the side of piston 44 exposed to pressurized fluid will have cleared beveled portion 72 to a degree allowing pressurized fluid to flow from cavity 22 to chamber 54. The resulting pressurization of piston 52 urges piston 52 away from piston 44 which piston 44 remains fixed in position against nut 78 by virtue of the force derived from the differential area of opposite faces of piston 44 exposed to a common fluid pressure. It will be noted that the piston 44 face area exposed to chamber 54 is less than the area of the opposite face by an amount equal to the cross sectional area of skirt 46.

The effective area of piston 52 exposed to chamber 54 is made equal to the effective area of the piston 44 face exposed to cavity 22 by means of the post 63 which has a cross sectional area at the larger diameter thereof equal to the cross sectional area of annular skirt 42. In this manner, for a given applied braking fluid pressure, the force output derived from piston 52 can be made equal to that derived from piston 44 thereby tending to make the transition from one piston to the other substantially unnoticeable relative to the braking effect derived therefrom.

It will be understood that the beveled portion 72 of post 63 provides an extremely simple and effective way of venting the fluid pressure in cavity 22 to chamber 54 when piston 44 reaches its travel limit. However, it is apparent that other means such as a fluid pressure actuated valve means or valve actuated as a function of travel of piston 44 suitably connected to control communication between chamber 54 and cavity 22 may be substituted for the beveled portion 72 if desired.

I claim:

1. Extensible fluid pressure actuated piston means particularly adapted for use in a multiple disc aircraft disc brake provided with fixed piston carrier means providing limited axial travel of a piston carried thereby, said piston means comprising:
   a source of pressurized fluid;
   a sleeve threadedly engaged with said piston carrier means and connected to receive said pressurized fluid;
   a first piston slidably carried in said sleeve and responsive to said pressurized fluid;
   a second piston slidably carried by said first piston and together with said first piston defining a fluid chamber;
   a circular stud extending through said first piston and provided with a radially outwardly extending plate at one end thereof which plate is engaged at its radially outermost portion by said sleeve to fixedly secure said stud in position in said piston carrier means;
   flexible fluid seal means operatively connected to said first piston means for slidable engagement with said stud to provide a fluid seal therebetween;
   a reduced diameter section formed on said stud and provided with an adjustable stop member threadedly engaged therewith;
   said first piston being displaced by said pressurized fluid to a predetermined position defined by said stop member where said fluid seal means registers with said reduced diameter section to vent said pressurized fluid to said chamber;
   said second piston being responsive to said pressurized fluid vented to said chamber and urged thereby axially away from said first piston to provide a corresponding extension thereof.

2. Extensible fluid pressure actuated piston means, as claimed in claim 1, wherein:
   said first piston is provided with a skirt portion;
   said second piston being slidably contained by said skirt portion.

3. Extensible fluid pressure actuated means as claimed in claim 2 wherein:
   said circular stud is provided with a cross sectional area equal to the cross sectional area of said skirt portion to thereby equalize the effective fluid pressure responsive areas of said first and second pistons.

4. Extensible fluid pressure actuated piston means, as claimed in claim 1, wherein:
   said first piston is provided with normally closed bleed valve means adapted to be opened to permit retraction of said piston into said first piston.

5. Extensible fluid pressure actuated piston means, as claimed in claim 1, wherein:
   said first piston is provided with a central opening through which said stud extends and said recess surrounding said opening;
   said annular recess adapted to receive an annular flexible fluid seal slidably engaged with said stud.

* * * * *